(12) United States Patent
Gupta et al.

(10) Patent No.: US 11,537,682 B1
(45) Date of Patent: Dec. 27, 2022

(54) EXPERIENCE CONVERGENCE FOR MULTIPLE PLATFORMS

(71) Applicant: Intuit Inc., Mountain View, CA (US)

(72) Inventors: Vipin Gupta, Mountain View, CA (US); Govinda Sambamurthy, Bangalore (IN); Anand Patil, Bangalore (IN); Nischith Bagivalu Manjegowda, Bangalore (IN); Chandraprakash Joshi, Bangalore (IN); Saraswati Hedge, Bangalore (IN)

(73) Assignee: Intuit Inc., Mountain View, CA (US)

( * ) Notice: Subject to any disclaimer, the term of this patent is extended or adjusted under 35 U.S.C. 154(b) by 40 days.

(21) Appl. No.: 16/519,878

(22) Filed: Jul. 23, 2019

(51) Int. Cl.
*G06F 16/958* (2019.01)
*G06F 16/957* (2019.01)
*G06F 13/40* (2006.01)
*G06F 9/30* (2018.01)
*G06F 9/50* (2006.01)

(52) U.S. Cl.
CPC ...... *G06F 16/9577* (2019.01); *G06F 9/30123* (2013.01); *G06F 9/5005* (2013.01); *G06F 13/4027* (2013.01); *G06F 16/958* (2019.01)

(58) Field of Classification Search
CPC .......... G06F 17/24; G06F 17/25; G06T 11/60; A63F 2300/5553; A63F 2300/6623

USPC ................ 715/201, 202, 230, 255
See application file for complete search history.

(56) References Cited

U.S. PATENT DOCUMENTS

| 2017/0006119 A1* | 1/2017 | Pogrebinsky ........... G06F 9/541 |
| 2019/0130286 A1* | 5/2019 | Salameh ................ G06N 5/022 |
| 2020/0137093 A1* | 4/2020 | Janakiraman ....... H04L 63/0263 |

\* cited by examiner

*Primary Examiner* — Ariel Mercado
*Assistant Examiner* — Jenq-Kang Chu
(74) *Attorney, Agent, or Firm* — DLA Piper LLP (US)

(57) ABSTRACT

A processor may launch a common layer including a browser and a shell. The processor may identify a request for data required by the software platform. The processor may determine a context in which the request was generated by detecting, by the shell, whether the software platform is an on-premise solution or a cloud solution; examining, by the shell, the request to determine whether it requires local resources or cloud-based resources; and designating, by the shell, the context as a cloud-based context or an on-premise context based on the detecting and the examining. In response to the determining, the processor may perform processing related to a request generated in the on-premise context using at least one local resource stored in a local data store; and communicate, by the browser, with at least one cloud-based resource to perform processing related to a request generated in the cloud-based context.

20 Claims, 6 Drawing Sheets

EXPERIENCE CONVERGENCE FOR MULTIPLE PLATFORMS

DETAILED DESCRIPTION OF SEVERAL EMBODIMENTS

Figure 1:
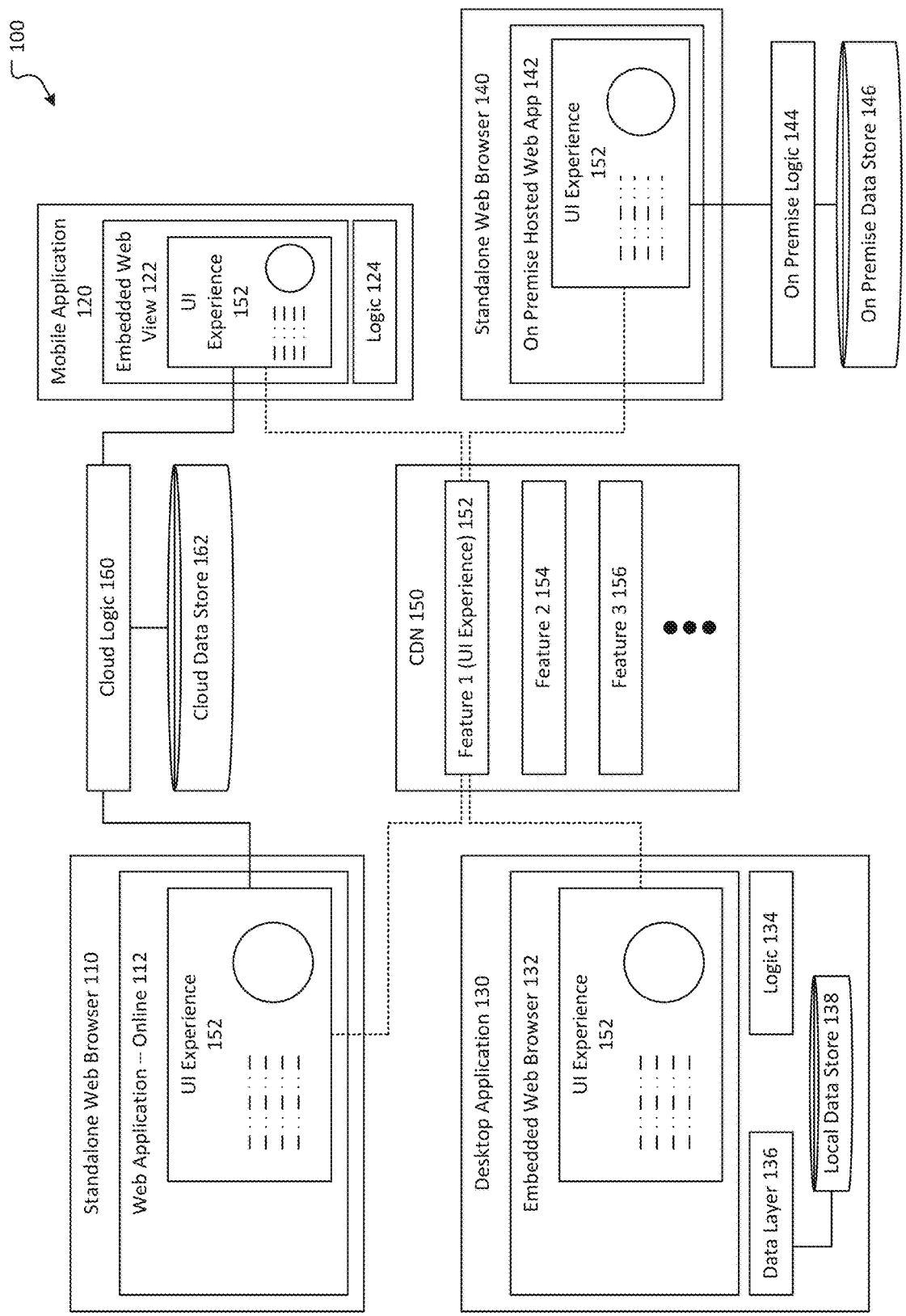
FIG. 1 shows a software platform ecosystem according to an embodiment of the present disclosure.

Software may be deployed as an on-premise solution, a cloud solution, or a combination thereof. An on-premise solution may be installed locally on an end user's computing device(s), whereas a cloud solution may be hosted on a vendor's server and may be accessed by the end user with a web browser or other communication software. Examples of on-premise solutions may include desktop applications installed on a user's device, hosted web applications wherein the entire web application is hosted on a user's local network, or other applications wherein the user has control of one or more of the devices hosting the solution. Cloud solutions may be the inverse of on-premise solutions in that the devices hosting the solution may be provided by external sources and accessed by a user through a browser or other portal, but not otherwise controlled by the user's device.

Cloud solutions and on-premise solutions may have relative advantages and disadvantages which may lead different end users to choose different solutions. For example, cloud solutions may provide the benefits of accessibility, low up-front cost, predictable operational expenditure, automatic and hassle-free upgrades, automatic security patches, quick deployments of new feature enhancements, scalability, etc. However, cloud solutions may require reliable internet connectivity, may generate long-term costs, may exhibit security issues since user data is on the cloud, etc. On the other hand, on-premise solutions may have downsides such as high upfront costs, user responsibility of hardware and software maintenance, overhead of manual software upgrades and security patches, etc., but may also provide benefits such as reduction in total cost of ownership over time in some cases, better application performance, functionality without internet connectivity, user control of when and how upgrades are installed, data security, isolation and/or ownership, etc. Accordingly, many software packages may provide on-premise and cloud versions to suit different scenarios and/or end users. In order to provide multiple software solutions, including on-premise and cloud versions of a software package, multiple code bases and deployments may be managed, which may cause maintenance overhead.

While on-premise and cloud solutions may require different code in some situations due to the different environments in which they operate and/or due to different services they provide, it may be beneficial to reuse code when possible. Systems and methods described herein may deliver experience convergence between on-premise and cloud solutions through the use of a context aware common layer, where maximum code reuse among the different solutions may be achieved. For example, some embodiments may provide on-premise solutions operating with a thin local data layer wherein application data may be stored locally, while other features (e.g., user interface (UI), business logic, etc.) may be shared with cloud-based solutions. Some embodiments may provide cloud solutions wherein application data and other features may both be stored in the cloud. A context-aware common layer, which may include a shell, embedded web browser, and/or other software components, may be present within both types of solutions and may be configured to determine an operating context of the particular solution automatically. For example, the shell may determine whether the solution is on-premise or cloud based. Shared assets may be stored using a Content Delivery Network (CDN) or other data sharing platform. The embedded web browser may interact with the CDN to load and/or download and/or update data from the CDN to the platform in a manner that is appropriate for the determined context. The context determination can also be used to appropriately branch processing related to the shared assets, for example determining whether to store sensitive user data locally in a local data store or remotely in a cloud data store depending on the context.

In some embodiments, some portions of the on-premise software may be provided remotely by the same services that provide similar cloud services, providing straightforward code reuse and user experience convergence. Accordingly, the disclosed embodiments may provide freedom of choice to end users without forcing high development and/or maintenance cost on software vendors. Moreover, the disclosed embodiments may streamline code development, testing, and troubleshooting by allowing code changes to persist among multiple software solutions. Additionally, the disclosed embodiments may enable sharing not only of variable and/or updatable content (e.g., through the CDN), but also of code that determines context (e.g., using the shell) and gathers the content based on the determination (e.g., using the embedded web browser) and/or performs other processing based on the determination.

FIG. 1 shows a software platform ecosystem 100 according to an embodiment of the present disclosure. Ecosystem 100 may include a variety of access options for a software solution. In the following example, the software solution provides accounting features (e.g., the software solution may be QuickBooks™ or a similar accounting suite, which may include an online version (QuickBooks™ Online), a standalone version (QuickBooks™ Desktop), and/or a mobile version (QuickBooks™ Mobile). However, this is presented as an example only, and the experience convergence systems and methods described herein may be applicable to any software ecosystem having multiple platform types (e.g., on-premise and/or cloud), rendered on any form factor such as PC, tablet, or mobile, providing any type of functionality.

In some embodiments, the solution may be accessible through a standalone web browser accessing a web application 110, a mobile application 120, a desktop application 130, a standalone web browser accessing an on-premise hosted web application 140, or a combination thereof. Each option may provide a separate interface. For example, standalone browser 110 may present an online web application 112 therein, mobile application 120 may present an embedded web view 122 therein, desktop application 130 may present an embedded browser 132 therein, and/or standalone browser 140 may present an on-premise hosted web application 142 therein. Some secondary UI aspects and/or processing steps of the various options may differ in some embodiments. However, each of these options may provide a common UI experience 152 related to application functionality (e.g., accounting data processing and/or user data storage).

One example aspect by which the options may differ may be a location at which application data is processed and/or stored. For example, some options may be cloud solutions. In the example ecosystem 100 of FIG. 1, standalone web browser 110 and mobile application 120 may be cloud solutions. The cloud solutions may include thin local layers executing on respective computing devices (e.g., computing device 600 of FIG. 6, described below). For example, a thin local layer may include online web application 112 and/or embedded web view 122. The thin local layers may include some application elements executed locally, such as context-aware common layer 200 of FIG. 2, described below. Some cloud solutions may perform some application functionality processing locally (e.g., native business logic 124 of mobile application 120 may perform some processing locally), but each cloud solution may store user data in cloud data store 162 in a memory of a cloud device and/or may perform some or all application functionality processing in the cloud (e.g., by cloud business logic 160).

Other options may be on-premise solutions. In the example ecosystem 100 of FIG. 1, desktop application 130 and standalone web browser 140 may be on-premise solutions. The on-premise solutions may include local layers executing on respective computing devices (e.g., computing device 600 of FIG. 6, described below) that may be thicker (e.g., have more functionality) than the thin layers of the cloud solutions. For example, a thicker local layer may include embedded web browser 132. In some embodiments, on-premise solutions may use thin layers similar to the cloud solutions, such as on-premise hosted web application 142. The thin and/or thicker local layers may include some application elements executed locally, such as context-aware common layer 200 of FIG. 2, described below. Thicker local layers may perform business logic (application functionality) functions and data storage locally. For example, embedded web browser 132 may use native business logic 134 to perform application functions and may use data layer 136 to access local data store 138 in local memory to store user data locally. Thin local layers may use off-device computers to perform application functions and storage, but these off-device computers may be different from the cloud computers used by cloud solutions. For example, on-premise hosted web application 142 may use on-premise logic 144 to perform application functions and may use on-premise data store 146 to store user data. On-premise logic 144 and on-premise data store 146 may be on-premise in the sense that they may be hosted by a computing device 600 such as a local server that may be accessible only by an on-premise network.

Each solution, including cloud solutions and on-premise solutions, may access data provided by CDN 150 to facilitate experience convergence. CDN 150 may store shared assets, or "experience convergence content," related to one or more features (e.g., feature 1 152, feature 2 154, feature 3 156, etc.). Experience convergence content for each feature may be re-used across any or all of the solutions described above. Some examples provided below are presented in the context of providing shared assets for a UI experience feature 1 152 (e.g., including UI elements built using JavaScript/CSS/HTML and/or other static assets), although other software features may be shared among the various solutions. For example, any features adhering to the following principles may be shared. According to one principle, the features may have clearly defined scopes of reusable experiences (e.g., may not contain solution-specific logic). According to another principle, composition pattern (rather than inheritance pattern), may be used to apply the shared assets to specific solutions.

Figure 2:
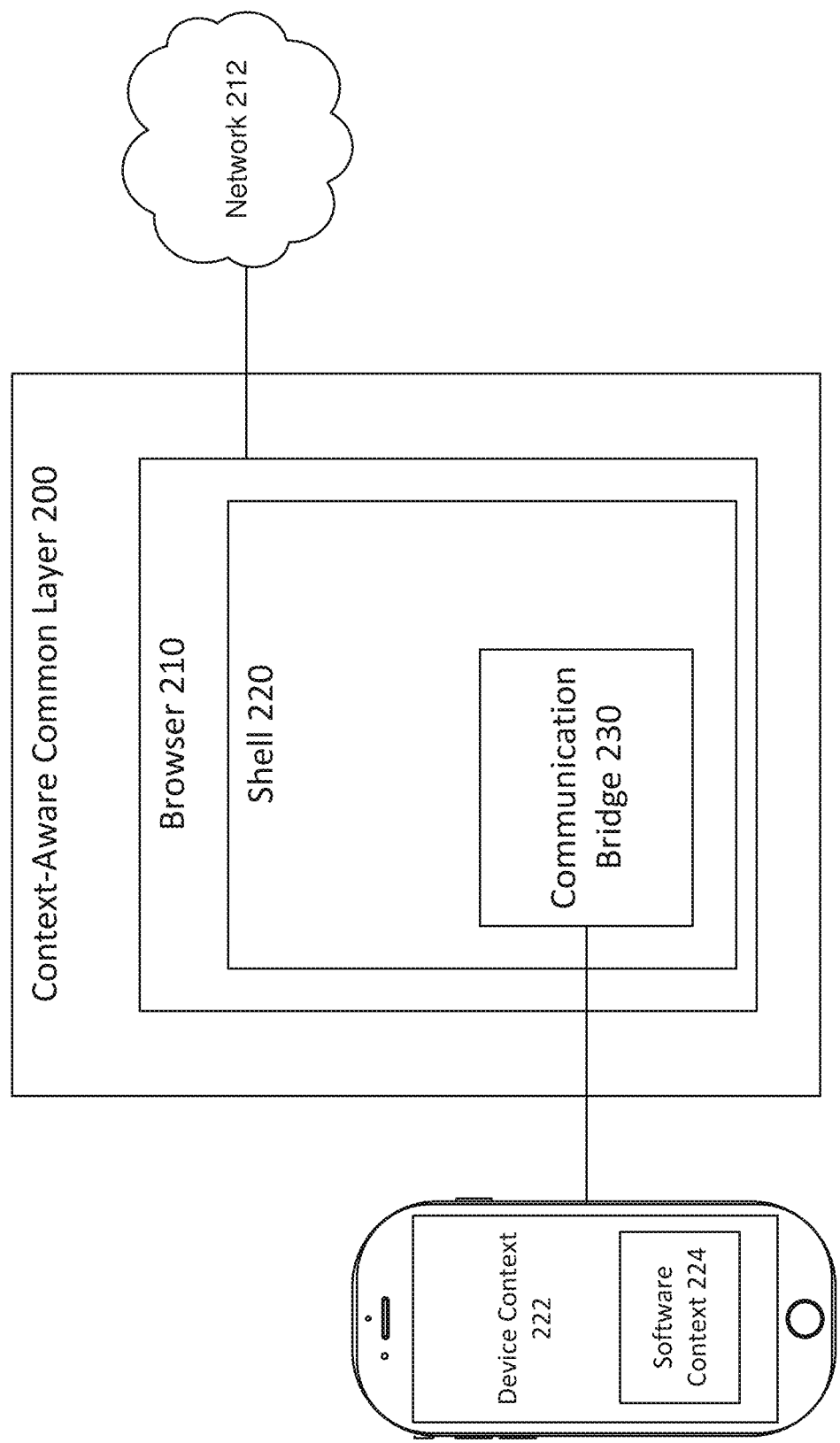
FIG. 2 shows a context-aware common layer according to an embodiment of the present disclosure.

FIG. 2 shows a context-aware common layer 200 according to an embodiment of the present disclosure. Common layer 200 may be configured to determine context(s) under which a solution is operating and obtain and/or access assets held by CDN 150 accordingly, and thus may be considered "context-aware." Common layer 200 may be present in each solution, including cloud solutions and on-premise solutions, such as web application 112 available through web browser 110, mobile application 120, desktop application 130, and/or web application 142 available through web browser 140.

Common layer 200 may include embedded web browser 210 and/or other communications software. Web browser 210 may be configured to communicate with one or more computing devices through network 212. For example, web browser 210 may communicate with CDN 150 to obtain assets held thereby.

Common layer 200 may include shell 220. Shell 220 may be an interface between common layer 200 and operating system services of the device on which the solution is operating, for example. Shell 220 may be a context-aware element of common layer 200. As described in detail below with respect to FIGS. 3-5, shell 220 may determine device context 222 and/or software context 224, where device context 222 may include one or more aspects of a computing device operating a given solution, and software context 224 may include one or more aspects of the solution itself. For example, device context 222 may include device type (e.g., smartphone, tablet, personal computer, and/or specific models thereof), screen size and/or resolution, screen orientation, operating system and/or browser type and/or version, etc. In some embodiments, device context 222 may include operating status of the device, such as whether the device is connected to network 212, whether other software is active on the device, etc. Software context 224 may include type of solution (e.g., web application 112 available through web browser 110, mobile application 120, desktop application 130, and/or web application 142 available through web browser 140) and/or state of solution (e.g., current UI being presented by the solution, etc.). The context information may be obtained from operating system services of the device on which the solution is operating in some embodiments, for example.

To facilitate determination of context, the on-premise shell 220 may inject a communication bridge 230 during a bootstrap and/or startup operation of shell 220. The presence of the communication bridge 230 may override any business logic that may perform read/write operations to cloud storage. The communication bridge 230 may provide synchronous and/or asynchronous APIs which may act as an abstraction for local storage and native business logic. During the bootstrap and/or startup, the communication bridge 230 may subscribe and/or register to lifecycle events of the shell 220 and/or application to perform context aware functionality and thereby determine device context 222 and/or software context 224.

Based on context determined by shell 220, browser 210 may obtain appropriate assets from CDN 150, and the solution operating common layer 200 may use the assets to provide one or more software features to the user. Some example methods by which common layer 200 may perform these tasks are described with respect to FIGS. 3-5.

Figure 3:
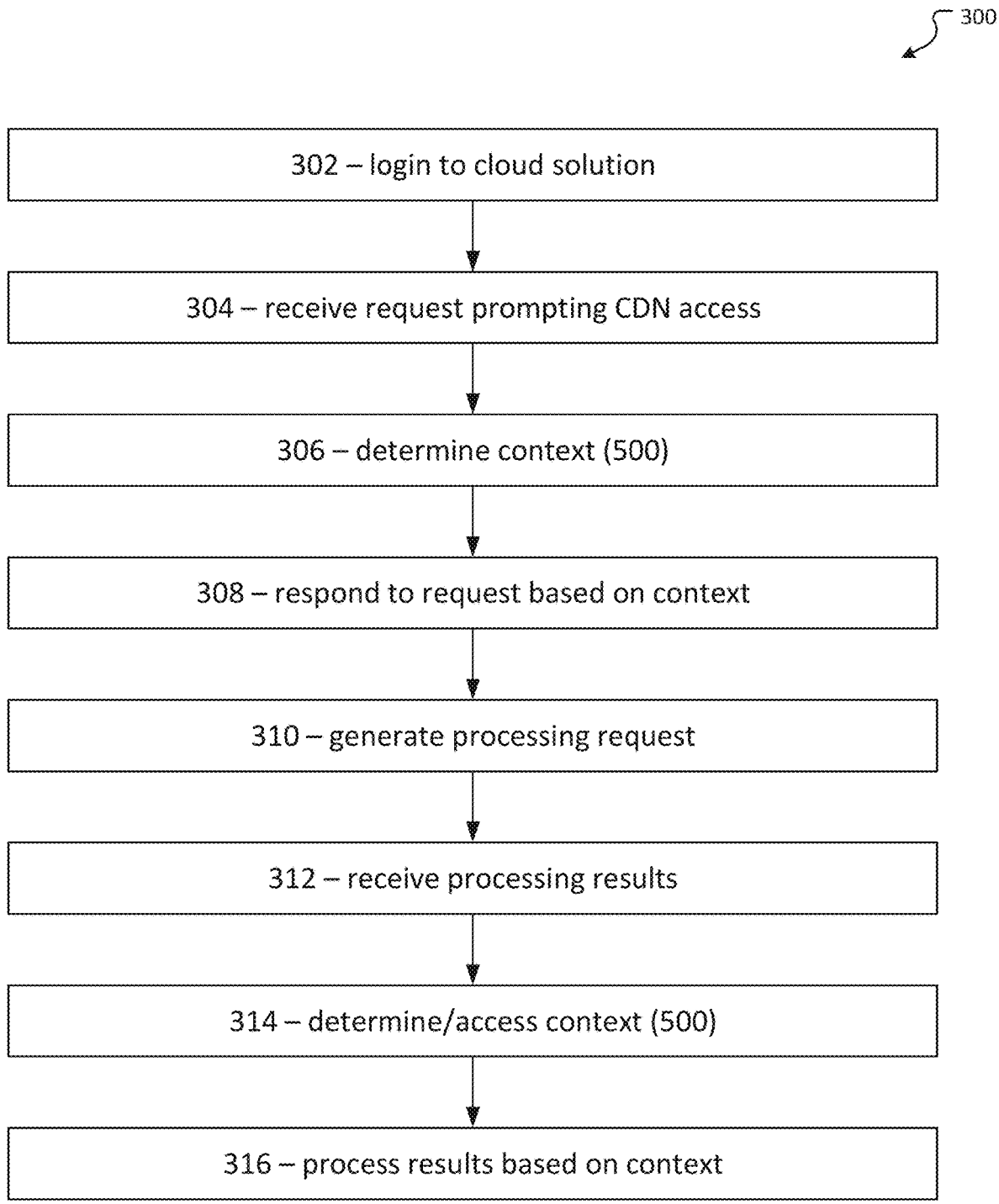
FIG. 3 shows a cloud solution interaction process according to an embodiment of the present disclosure.

FIG. 3 shows a cloud solution interaction process 300 according to an embodiment of the present disclosure. Process 300 is an example of how CDN 150 may provide experience convergence content (e.g., for UI experience feature 1 152) in a cloud-based context. Process 300 may be performed by one or more elements of ecosystem 100. For example, one or more computing devices using and/or providing a cloud solution (e.g., web application 112 available through web browser 110, mobile application 120, etc.) and/or CDN 150 may perform process 300.

At 302, accessing the cloud solution may begin. For example, a user of a computing device may log into the cloud solution remotely through a network connection (e.g., network 212). Some examples may include logging into an account with mobile application 120 or using web browser 110 to go to a URL providing web application 112 and logging into an account at web application 112.

At 304, the cloud solution may attempt to perform an action that requires cloud-based resources including data stored in the cloud (which may include data available through CDN 150 in some embodiments). For example, a user may request access to an interface or functionality that leverages one or more assets stored in the cloud. For the following example used to describe FIG. 3, assume the user wishes to access a UI experience provided by assets related to feature 1 152. However, accessing other features' assets (e.g., feature 2 154, feature 3 156, or any other feature) may be performed similarly in some embodiments.

At 306, common layer 200 of the cloud solution may determine the context under which the request from 304 was made. For an example of how common layer 200 may determine context, see process 500 of FIG. 5, which is described in detail below. For a cloud solution, common layer 200 may determine that the context is a cloud-based context. Accordingly, cloud business logic 160 may be used for performing business logic processing, and cloud data store 162 may be used for performing data storage. In some embodiments, common layer 200 may determine the specific cloud solution context if multiple contexts are possible (e.g., provided by online web application 112 or mobile application 120).

At 308, the cloud solution may respond to the request based on the context determined at 306. In the case of a cloud solution, there may not be local assets related to feature 1 152 on the device being used to access the cloud solution. Accordingly, assets related to feature 1 152 may be fetched from CDN 150 and used to provide the requested UI experience 152 in the web application 112 or embedded web view 122 of mobile application 120.

At 310, a processing request may be generated. For example, the user may request processing of data through UI experience 152 and/or the device used to access the cloud solution may generate the request automatically based on user interactions with UI experience 152. In some embodiments, the processing request may proceed through network 212 to a remote server, where the requested processing may occur. For example, a user may enter tax-related data into the UI provided by UI experience 152, and the remote server may perform one or more tax calculations using the tax-related data.

At 312, the remote server may return processing results in response to the request of 310. For example, the remote server may send the results through network 212 to the device used to access the cloud solution, and the results may be displayed through UI experience 152 and/or further processed (e.g., at 316).

At 314, common layer 200 of the cloud solution may determine the context under which the processing results were received at 312. For an example of how common layer 200 may determine context, see process 500 of FIG. 5, which is described in detail below. For a cloud solution, common layer 200 may determine that the context is a cloud-based context. Accordingly, cloud business logic 160 may be used for performing business logic processing, and cloud data store 162 may be used for performing data storage. In some embodiments, common layer 200 may determine the specific cloud solution context if multiple contexts are possible (e.g., provided by online web application 112 or mobile application 120). In some embodiments, common layer 200 may use the same determination of context from 306 rather than performing a context determination process (e.g., process 500 or a portion thereof) again.

At 316, the cloud solution may process the results received at 312 based on the context determined at 314. In the case of a cloud solution, this may include providing the results to cloud business logic 160 and/or storing the results in cloud data store 162.

Figure 4:
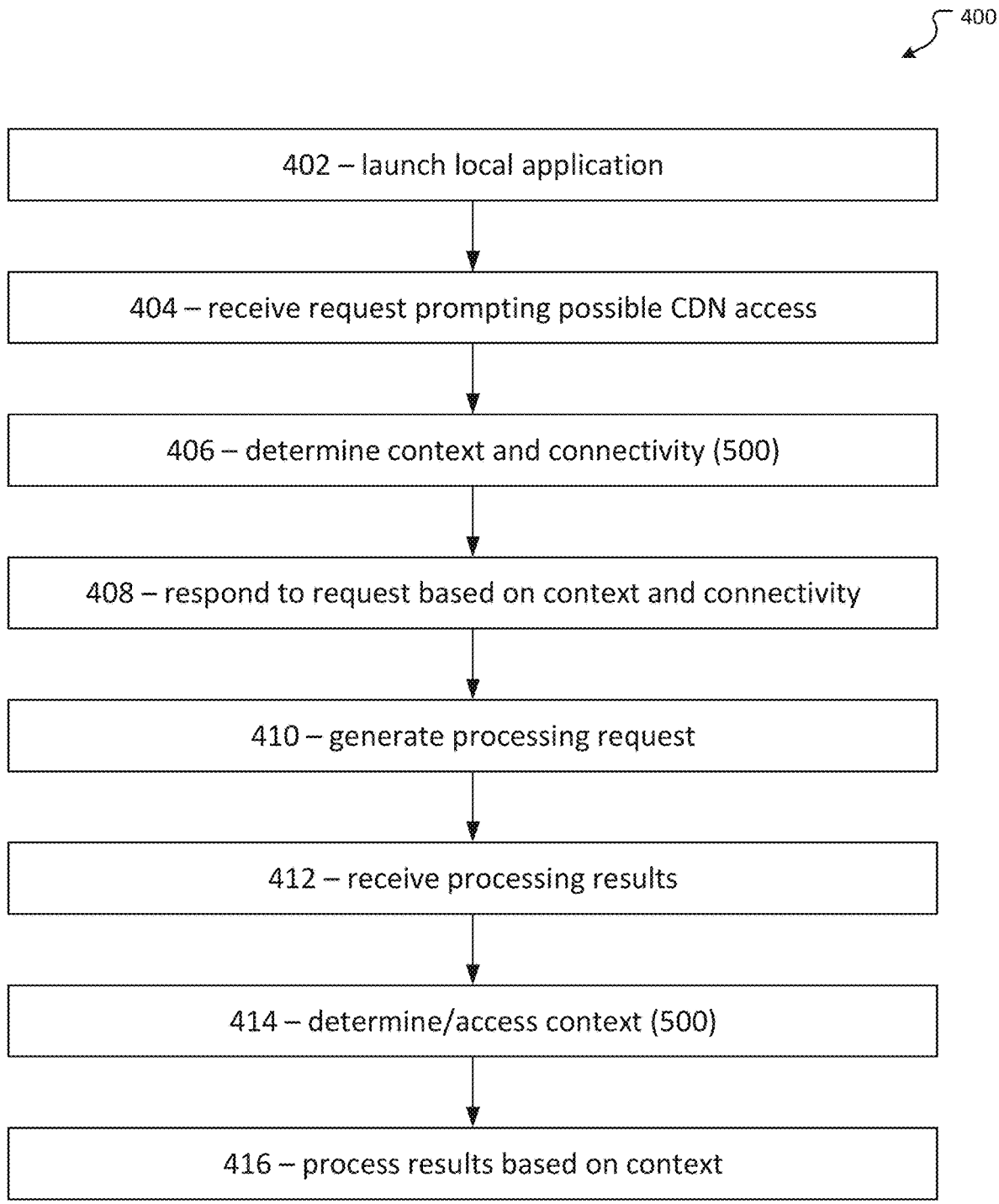
FIG. 4 shows an on-premise solution interaction process according to an embodiment of the present disclosure.

FIG. 4 shows an on-premise solution interaction process 400 according to an embodiment of the present disclosure. Process 400 is an example of how CDN 150 may provide experience convergence content (e.g., for UI experience feature 1 152) in an on-premise context. Process 400 may be performed by one or more elements of ecosystem 100. For example, one or more computing devices using and/or providing an on-premise solution (e.g., desktop application 130, web application 142 available through web browser 140, etc.) and/or CDN 150 may perform process 300.

At 402, accessing the on-premise solution's local application may begin. For example, a user of a computing device may launch a local application. Some examples may include launching desktop application 130 or using web browser 140 to go to a URL providing on-premise hosted web application 142 and logging into an account at on-premise hosted web application 142. In either case, the local application may be configured to communicate remotely with other computing devices through a network (e.g., network 212).

At 404, the local application may attempt to perform an action that requires cloud-based resources including data stored in the cloud. For example, a user may request access to an interface or functionality that leverages one or more assets stored by CDN 150. For the following example used to describe FIG. 4, assume the user wishes to access a UI experience provided by assets related to feature 1 152. However, accessing other features' assets (e.g., feature 2 154, feature 3 156, or any other feature) may be performed similarly in some embodiments.

At 406, common layer 200 of the on-premise solution may determine the context under which the request from 404 was made. For an example of how common layer 200 may determine context, see process 500 of FIG. 5, which is described in detail below. For an on-premise solution, common layer 200 may determine that the context is an on-premise context. In some embodiments, the particular on-premise context may be determined if multiple contexts are possible. For example, the context may be a desktop context (e.g., through desktop application 130) using local resources, such as local business logic 134 used for performing business logic processing and local data store 138 used for performing data storage. In another example, the context may be an on-premise hosted context (e.g., through web application 142), wherein on-premise business logic 144 may be used for performing business logic processing, and on-premise data store 146 may be used for performing data storage.

At 408, the on-premise solution may respond to the request based on the context determined at 406. In the case of an on-premise solution, device context 222 may affect how the request is processed. For example, if device context 222 indicates that the device is connected to network 212, assets related to feature 1 152 may be fetched from CDN 150 and used to provide the requested UI experience 152 in the desktop application 130 or on-premise hosted web application 142 of web browser 140. Furthermore, the device may cache the assets from CDN 150 locally, for example in local data store 138, and/or remotely, for example in on-premise data store 146. Accordingly, if device context 222 indicates that the device is not connected to network 212, assets related to feature 1 152 may be fetched from cache in local data store 138 and/or on-premise data store 146.

At 410, a processing request may be generated. For example, the user may request processing of data through UI experience 152 and/or the device used to run the on-premise solution may generate the request automatically based on user interactions with UI experience. 152. In some embodiments, the processing request may proceed through network 212 to a remote server, where the requested processing may occur. For example, a user may enter tax-related data into the UI provided by UI experience 152, and the remote server may perform one or more tax calculations using the tax-related data.

At 412, the remote server may return processing results in response to the request of 410. For example, the remote server may send the results through network 412 to the device used to run the on-premise solution, and the results may be displayed through UI experience 152 and/or further processed (e.g., at 416).

At 414, common layer 200 of the on-premise solution may determine the context under which the processing results were received at 412. For an example of how common layer 200 may determine context, see process 500 of FIG. 5, which is described in detail below. For an on-premise solution, common layer 200 may determine that the context is an on-premise context. In some embodiments, the particular on-premise context may be determined if multiple contexts are possible. For example, the context may be a desktop context (e.g., through desktop application 130) using local resources, such as local business logic 134 used for performing business logic processing and local data store 138 used for performing data storage. In another example, the context may be an on-premise hosted context (e.g., through web application 142), wherein on-premise business logic 144 may be used for performing business logic processing, and on-premise data store 146 may be used for performing data storage. In some embodiments, common layer 200 may use the same determination of context from 406 rather than performing a context determination process (e.g., process 500) again.

At 416, the on-premise solution may process the results received at 412 based on the context determined at 414. In the case of an on-premise solution, this may include providing the results to available business logic and/or storing the results in an available data store depending on software context 224. For example, if software context 224 indicates that the solution is desktop application 130, the results may be provided to local business logic 134 and/or may be stored in local data store 138. In another example, if software context 224 indicates that the solution is on-premise hosted web application 142, the results may be provided to on-premise business logic 144 and/or may be stored in on-premise data store 146.

Figure 5:
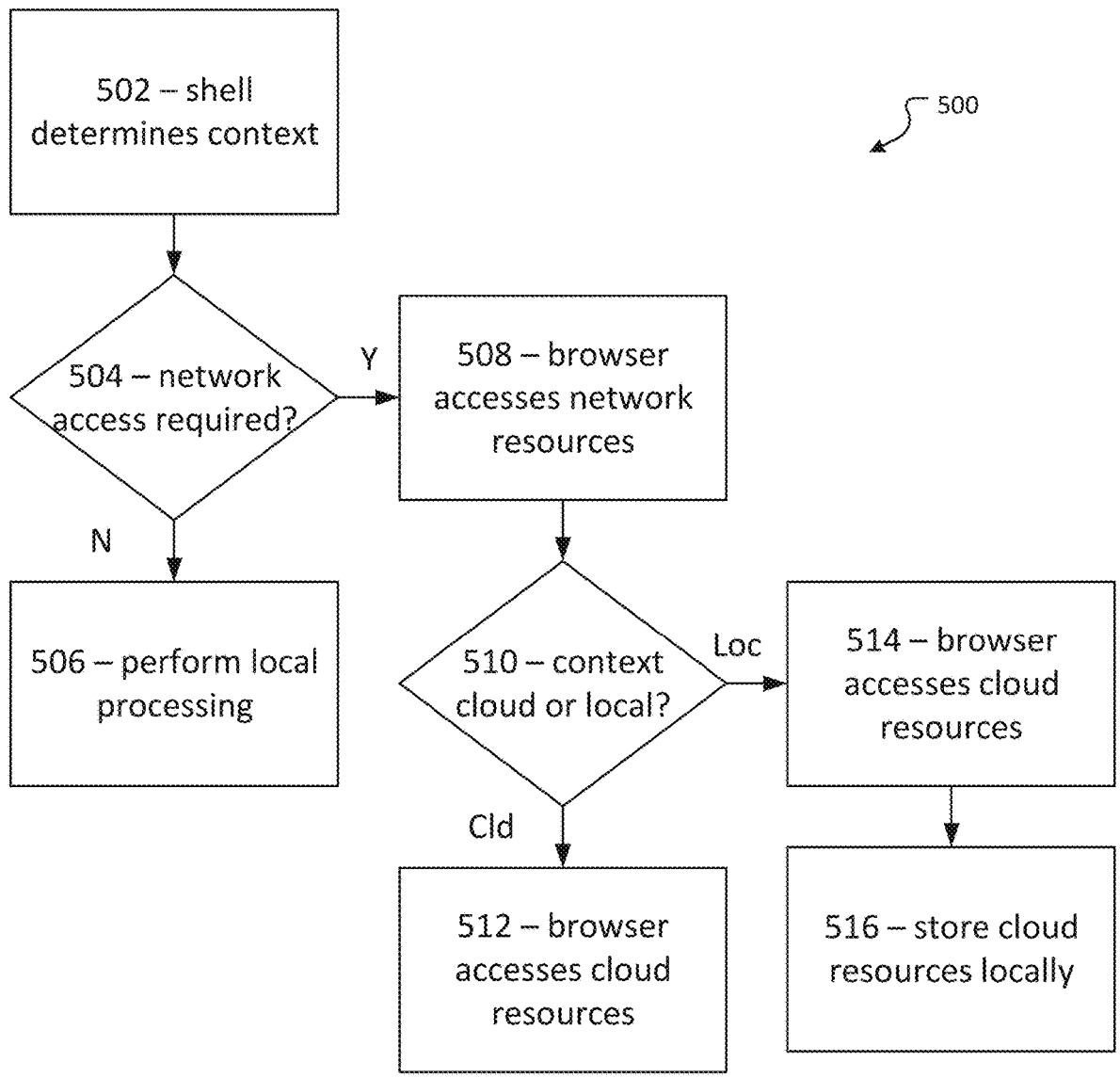
FIG. 5 shows a context determination process according to an embodiment of the present disclosure.

FIG. 5 shows a context determination process 500 according to an embodiment of the present disclosure. Common layer 200 may perform process 500 to determine a context that may be used in process 300 and/or 400 as described above. For example, common layer 200 may perform process 500 to facilitate responses to user requests (e.g., at 306 and/or 406) and/or to facilitate processing of remotely-generated results (e.g., at 314 and/or 414).

At 502, in response to a request for processing that may be context-dependent (e.g., as described above in processes 300 and/or 400), shell 220 may determine device context 222 and/or software context 224. As described above, device context 222 may include one or more aspects of a computing device operating a given solution, and software context 224 may include one or more aspects of the solution itself. For example, device context 222 may include device type (e.g., smartphone, tablet, personal computer, and/or specific models thereof), screen size and/or resolution, screen orientation, operating system and/or browser type and/or version, etc. In some embodiments, device context 222 may include operating status of the device, such as whether the device is connected to network 212, whether other software is active on the device, etc. Software context 224 may include type of solution (e.g., web application 112 available through web browser 110, mobile application 120, desktop application 130, and/or web application 142 available through web browser 140) and/or state of solution (e.g., current UI being presented by the solution, etc.). The on-premise shell 220 may inject a communication bridge 230 during a bootstrap and/or startup operation of shell 220. The presence of the communication bridge 230 may override any business logic that may perform read/write operations to cloud storage. The communication bridge 230 may provide synchronous and/or asynchronous APIs which may act as an abstraction for local storage and native business logic. During the bootstrap and/or startup, the communication bridge 230 may subscribe and/or register to lifecycle events of the shell 220 and/or application to perform context aware functionality. For example, if the operating context is an on-premise desktop application, the communication bridge 230 may be injected by shell which may act as an abstraction for reading/storing data from device local storage. Similarly, the communication bridge 230 may also act as an abstraction for performing native business logic. The communication bridge 230 injected by context aware shell may also subscribe to lifecycle events of the shell, such as before-shell-startup, on-shell-startup, on-shell-shutdown, etc., thereby becoming configured to perform appropriate business logic. For example, the communication bridge 230 in the context of on-premise desktop application may subscribe to shell life-cycle event "before-shell-startup" and perform native business logic and/or read from local device store. Similarly, the communication bridge 230 injected by context aware shell may also subscribe to lifecycle events of the application itself, such as on-load, on-success, and/or on-unload of the application feature, thereby becoming configured to perform native business logic and/or write to local device store. For example, the communication bridge 230 in the context of on-premise desktop application may subscribe to application life-cycle event "on-success" and perform native business logic such as showing a success message to the user using native user interface and/or write to local device store with transaction details.

At 504, shell 220 may determine whether accessing network 212 is required to perform the requested processing based on the context and the request. For example, some types of processing may be performed by local logic (e.g., logic 124 of mobile application 120 or logic 134 of desktop application 130). However, other types of processing may require external resources such as cloud logic 160 and/or data supplied by CDN 150. For example, communication bridge 230 may determine what resources are required for a given context as determined at 502, based on the requested read/write operations to cloud storage.

At 506, if accessing network 212 is not required as determined at 504, shell 220 may cause processing to respond to the request to be performed locally. For example, processing may be performed by local logic (e.g., logic 124 of mobile application 120 or logic 134 of desktop application 130).

At 508, if shell 220 has determined that cloud logic 160 is required to process some or all of the request, browser 210 may connect with cloud logic 160 through network 212. For example, browser 210 may send data to be processed to cloud logic 160 and receive a response including processing results from cloud logic 160. In some embodiments, browser 210 may be unable to connect with cloud logic 160 (e.g., because network 212 is down, or browser 210 is otherwise detecting or experiencing connectivity problems). In this case, browser 210 may return an error, and an error message may be displayed to the user.

At 510, in some embodiments, shell 220 may determine device context 222 and/or software context 224. In some embodiments, shell 220 may use the same determination as was made at 502, but in other embodiments, shell 220 may determine device context 222 and/or software context 224 a second time. For example, the context may include an on-premise context or a cloud based context. The former option may be processing efficient because it does not duplicate the determination process. The latter option may allow shell 220 to detect changes in context (e.g., a loss of network 212 connection, a change in application activity, etc.).

At 512, if shell 220 has determined that the context includes a cloud based context at 510, browser 210 may connect with CDN 150 through network 212 and download the required resources from CDN 150. In some embodiments, browser 210 may be unable to connect with CDN 150 (e.g., because network 212 is down, or browser 210 is otherwise detecting or experiencing connectivity problems). In this case, browser 210 may return an error, and an error message may be displayed to the user.

At 514, if shell 220 has determined that the context includes an on-premise context at 510, browser 210 may connect with CDN 150 through network 212 and download the required resources from CDN 150. In some embodiments, browser 210 may be unable to connect with CDN 150 (e.g., because network 212 is down, or browser 210 is otherwise detecting or experiencing connectivity problems). In this case, browser 210 may obtain a locally cached copy of the resources if they are available in the local data store. If a cached copy is not available, browser 210 may return an error, and an error message may be displayed to the user.

At 516, in the case of the on-premise context, the resources obtained from the CDN 150 may be stored in a local cache to be retrieved for future requests (e.g., in the event of lost network 212 connectivity and/or if the subsequent request is within a threshold time from the request currently being handled by process 500). For example, the resources may be stored in local data store 138 or on-premise data store 146.

As a result of the context-driven CDN 150 access of process 500, experience convergence for the various solutions of FIG. 1 and/or other embodiments may be achieved. The common experience may use responsive design guidelines and may work seamlessly across various devices and screen resolutions. The code from CDN 150 may be executed in the embedded browser 210 of any solution to seamlessly interoperate with local code. The code from CDN 150 may be reusable, extensible, and/or upgradeable centrally, propagating changes to all solutions.

Figure 6:
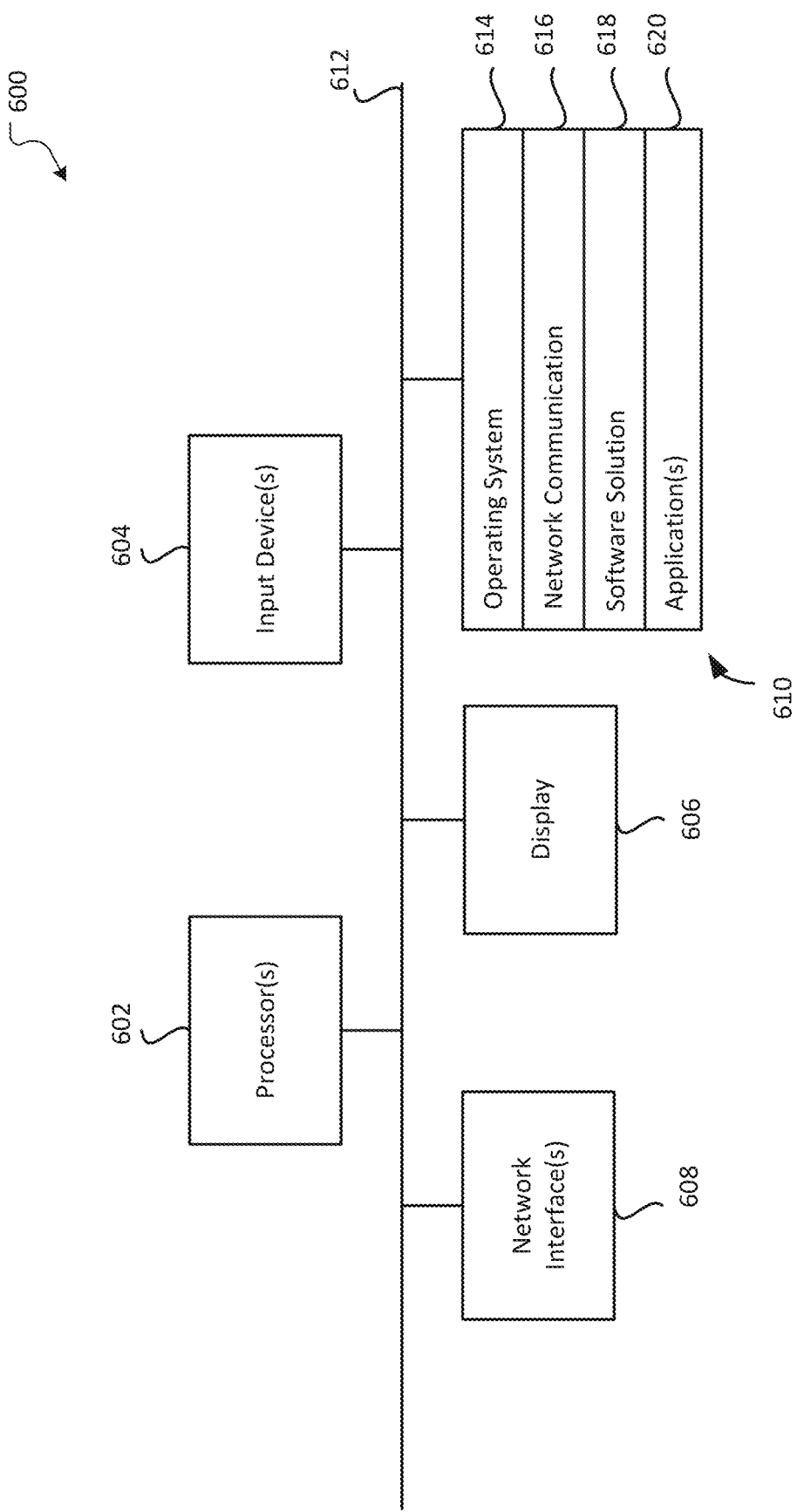
FIG. 6 shows a computing device according to an embodiment of the present disclosure.

FIG. 6 shows a computing device according to an embodiment of the present disclosure. For example, computing device 600 may function to provide access to the ecosystem 100 through standalone web browser accessing the web application 110, mobile application 120, desktop application 130, standalone web browser accessing the on-premise hosted web application 140, or a combination thereof. The computing device 600 may be implemented on any electronic device that runs software applications derived from compiled instructions, including without limitation personal computers, servers, smart phones, media players, electronic tablets, game consoles, email devices, etc. In some implementations, the computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux, Android®, etc.). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

Software instructions 618 may include instructions for accessing and/or using ecosystem 100 as described above.

For example, software instructions 618 may include instructions providing the context-aware common layer 200. Software instructions 618 may include instructions providing one or more of standalone web browser accessing the web application 110, mobile application 120, desktop application 130, standalone web browser accessing the on-premise hosted web application 140, or combinations or subsets thereof. Software instructions 618 may include instructions performing processes 300, 400, 500, or combinations or subsets thereof.

Application(s) 620 may be an application that uses or implements the processes described herein and/or other processes. The processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java, JavaScript), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a Random Access Memory (RAM) or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer. In some embodiments, the computer may have audio and/or video capture equipment to allow users to provide input through audio and/or visual and/or gesture-based commands.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:
1. A method of user experience convergence for a software platform, comprising:
launching, by a processor, a common layer including a browser and a shell, wherein the shell is a context-aware element of the common layer to interface between the common layer and operating system services of a device on which the software platform is operating;

identifying, by the processor, a request for accessing an interface or functionality required by the software platform;

determining, by the processor, a context in which the request was generated, the determining comprising:

detecting, by the shell, whether the software platform is an on-premise solution or a cloud solution;

examining, by the shell, the request to determine whether the request requires local resources or cloud-based resources; and designating, by the shell, the context as a cloud-based context or an on-premise context based on the detecting whether the software platform is an on-premise solution or a cloud solution and the examining the request to determine whether the request requires local resources or cloud-based resources; and in response to the determining:

performing, by the processor, processing related to the request generated in the on-premise context using at least one local resource stored in a local data store based on determining the context of the request as an on-premise context; or communicating, by the browser, with at least one cloud-based resource to perform processing related to the request generated in the cloud-based context based on determining the context of the request as a cloud-based context.

2. The method of claim 1, wherein the processing related to the request generated in the on-premise context includes:
processing an algorithm stored in the local data store; and
storing a result of processing the algorithm in the local data store.

3. The method of claim 1, wherein the processing related to the request generated in the cloud-based context includes:
downloading experience convergence content from the at least one cloud-based resource; and
displaying the experience convergence content by a display in communication with the processor.

4. The method of claim 3, wherein the processing related to the request generated in the cloud-based context further includes:
processing an algorithm stored in the local data store; and
storing a result of processing the algorithm in the local data store.

5. The method of claim 3, wherein the processing related to the request generated in the cloud-based context further includes:
sending a processing request to the at least one cloud-based resource;
receiving a result in response to the processing request from the at least one cloud-based resource; and
displaying the result.

6. The method of claim 3, wherein the processing related to the request generated in the cloud-based context further includes storing the experience convergence content in the local data store.

7. The method of claim 1, wherein:
a portion of the processing related to the request generated in the cloud-based context is performed by the processor in response to detecting the on-premise solution; and the portion of the processing related to the request generated in the cloud-based context is performed by the at least one cloud-based resource in response to detecting the cloud solution.

8. The method of claim 1, wherein the launching includes injecting a communication bridge by the shell, the communication bridge being configured to act as an abstraction for the request.

9. The method of claim 8, further comprising subscribing, by the processor, the communication bridge to at least one lifecycle event, wherein the determining is performed as a result of the subscribing.

10. A system configured to provide user experience convergence for a software platform, comprising:
a local data store; and
a processor in communication with the local data store and configured to communicate with at least one cloud-based resource through a network, the processor being configured to perform processing comprising:

launching a common layer including a browser and a shell, wherein the shell is a context-aware element of the common layer to interface between the common layer and operating system services of a device on which the software platform is operating;

identifying a request for accessing an interface or functionality required by the software platform;

determining a context in which the request was generated, the determining comprising:

detecting, by the shell, whether the software platform is an on-premise solution or a cloud solution;

examining, by the shell, the request to determine whether it requires local resources or cloud-based resources; and designating, by the shell, the context as a cloud-based context or an on-premise context based on the detecting whether the software platform is an on-premise solution or a cloud solution and the examining the request to determine whether the request requires local resources or cloud-based resources; and in response to the determining:

performing processing related to a request generated in the on-premise context using at least one local resource stored in a local data store; or communicating, by the browser, with at least one cloud-based resource to perform processing related to a request generated in the cloud-based context.

11. The system of claim 10, wherein the processing related to the request generated in the on-premise context includes:
processing an algorithm stored in the local data store; and
storing a result of processing the algorithm in the local data store.

12. The system of claim 10, wherein the processing related to the request generated in the cloud-based context includes:
downloading experience convergence content from the at least one cloud-based resource; and
displaying the experience convergence content by a display in communication with the processor.

13. The system of claim 12, wherein the processing related to the request generated in the cloud-based context further includes:
processing an algorithm stored in the local data store; and
storing a result of processing the algorithm in the local data store.

14. The system of claim 12, wherein the processing related to the request generated in the cloud-based context further includes:
   sending a processing request to the at least one cloud-based resource;
   receiving a result in response to the processing request from the at least one cloud-based resource; and
   displaying the result.

15. The system of claim 12, wherein the processing related to the request generated in the cloud-based context further includes storing the experience convergence content in the local data store.

16. The system of claim 10, wherein:
   the processor is configured to perform a portion of the processing related to the request generated in the cloud-based context in response to detecting the on-premise solution; and
   the portion of the processing related to the request generated in the cloud-based context is performed by the at least one cloud-based resource in response to detecting the cloud solution.

17. The system of claim 10, wherein the launching includes injecting a communication bridge by the shell, the communication bridge being configured to act as an abstraction for the request.

18. The system of claim 17, wherein the processing further includes subscribing the communication bridge to at least one lifecycle event, wherein the determining is performed as a result of the subscribing.

19. A non-transitory computer readable medium configured to store common layer instructions that, when executed by a processor, cause the processor to perform the following processing:
   launching the common layer, the common layer including a browser and a shell, wherein the shell is a context-aware element of the common layer to interface between the common layer and operating system services of a device on which the software platform is operating;
   identifying a request for accessing an interface or functionality required by a software platform executed by the processor;
   determining a context in which the request was generated, the determining comprising:
      detecting, by the shell, whether the software platform is an on-premise solution or a cloud solution;
      examining, by the shell, the request to determine whether it requires local resources or cloud-based resources; and
      designating, by the shell, the context as a cloud-based context or an on-premise context based on the detecting whether the software platform is an on-premise solution or a cloud solution and the examining the request to determine whether the request requires local resources or cloud-based resources; and
   in response to the determining:
      performing processing related to a request generated in the on-premise context using at least one local resource stored in a local data store; or
      communicating, by the browser, with at least one cloud-based resource to perform processing related to a request generated in the cloud-based context.

20. The non-transitory computer readable medium of claim 19, wherein the shell includes a communication bridge injected by the launching, the communication bridge being configured to act as an abstraction for the request.

* * * * *